United States Patent [19]
Whiffin

[11] Patent Number: 4,744,331
[45] Date of Patent: May 17, 1988

[54] APPARATUS FOR REARING FISH IN NATURAL WATERS

[76] Inventor: David E. Whiffin, 4003 Edinburgh Street, Vancouver, B. C., Canada, V5C 1R4

[21] Appl. No.: 873,410

[22] Filed: Jun. 12, 1986

[30] Foreign Application Priority Data

Jun. 14, 1985 [CA] Canada .................................. 484029

[51] Int. Cl.⁴ .......................................... A01K 63/00
[52] U.S. Cl. ..................................................... 119/3
[58] Field of Search ......................... 119/3, 51 R, 1, 2

[56] References Cited

U.S. PATENT DOCUMENTS

| | | | |
|---|---|---|---|
| 3,313,301 | 4/1967 | Jefferts et al. | 119/3 |
| 3,369,525 | 2/1968 | Debrotnic et al. | 119/3 |
| 4,235,198 | 11/1980 | Goguel | 119/3 |
| 4,312,296 | 1/1982 | Stelleman et al. | 119/3 |
| 4,351,438 | 9/1982 | Morton | 119/3 |
| 4,392,236 | 7/1983 | Sandstrom et al. | 119/3 |
| 4,626,992 | 12/1986 | Greaves et al. | 119/3 |

*Primary Examiner*—John E. Murtagh
*Assistant Examiner*—Caroline D. Dennison
*Attorney, Agent, or Firm*—Chernoff, Vilhauer, McClung & Stenzel

[57] ABSTRACT

A method and apparatus for rearing fish in natural waters in a confined area by monitoring key criteria of the natural waters and monitoring the feeding and weight gain of fish in the confining means on a systematic basis. An apparatus for raising fish in an enclosed environment in natural waters comprising: (a) means for enclosing and maintaining the fish in a confined location in naturally occurring waters; (b) means for feeding and culling the fish within the enclosing means; (c) means for monitoring water quality, weight gain and disease in each fish retained in the enclosing means; and (d) means for retaining an air pocket within the enclosing means.

21 Claims, 9 Drawing Sheets

APPARATUS FOR REARING FISH IN NATURAL WATERS

FIELD OF THE INVENTION

This invention is directed to a air-bell sea pen which is useful in the domestic rearing of fish in natural waters. More particularly, this invention is directed to an air-bell sea pen which can be electronically monitored and controlled from a remote location to locate an ideal environment for the rearing of fish in natural waters and to automatically cull sickly and dead fish from the school of fish being reared in the sea pen.

BACKGROUND OF THE INVENTION

In recent years, attempts have been made to domestically raise salmon in rearing farms located in natural waters, usually a mixture of fresh and saline sea water. These consist of large pens which are located at the surface. To date, these pens have not been very successful. Usually, water temperatures are too warm, and the fish are confined at shallower water depths than the ones at which they are comfortable. As a consequence, disease and loss of fish are prevalent.

Biologists who credited the increased salmon runs of 1966 and 1976 on the west coast of North America to improvements in hatchery techniques were largely mistaken. The major reason for the good returns, it has been discovered, was excellent water conditions caused by favourable large scale climatic and oceanographic conditions, noteably upwelling of nutrient rich water. Freshwater rearing conditions, while important, are secondary.

In the winter, natural salt waters stratify, with the colder denser water sinking to the bottom. In the spring and summer, a combination of wind, current and the earth's rotation causes the dense water to come to the surface. The cycle is driven by the typical northerly winds that blow during the summer. These winds tend to push the surface water layer southward. At the same time, the earth's rotation is causing the whole water mass to move from west to east. Because the surface layer is being pushed south, its eastward movement is relatively slower than the water underneath. It is therefore sheared to the west. The underlying water moves in to replace it. This creates a strip of cold water which lies along the west coast of North America in normal years in summer. Recently, the movement northward of the infamous El Nino retarded this upwelling process in two ways. First, by changing weather patterns, the strong northwesterlies were absent during the strong El Nino period. Second, when upwelling occurs in a strong El Nino year, the lower layers of water are not as cold and nutrient-rich as normal.

The nutrients that most frequently control and limit the rate of organic production in the sea are nitrate and phosphate carried in the ambient seawater. Perhaps not coincidentally, these elements are present in seawater in proportions which are very nearly the same as occur in plankton (15-1) (between 0.2 and 1 milligram/liter of water). Phosphorus is a structural component of the nucleic acids and is needed for the transfer of chemical energy within organisms. The cycle in the hydrosphere begins as phosphates, which are leached as dissolved salts or eroded as particles. These find their way to streams and lakes, where they are precipitated or enter living matter. The remainder enters the ocean and are consumed by plankton. As the bodies of planktonic plants and animals sink through the water column, the surface waters necessarily become depleted of phosphorus. Conversely, the deep waters are virtually saturated with calcium phosphate. Additions to the deep ocean pool are balanced by precipitation to the sediment. Upwelling of deep water to shallower waters is the only process which returns a portion of the phosphorus to the surface. Such upwelling generally coincides with rough waters on exposed shores where conditions for raising fish are optimum. Fish rearing pens located in protected bays using surface waters do not take advantage of such optimum conditions. Fish generally are not adapted to develop defensive mechanisms to foreign bodies and thus are unable to survive in unfavourable environments for long periods of time. Surface pens inherently provide an unfavourable environment.

The applicant is aware of the following references which are believed to be more or less pertinent to this invention:

| U.S. Pat. No. | Inventor | Issue Date |
| --- | --- | --- |
| 3,691,994 | McPherson | Sept. 19, 1972 |
| 3,698,359 | Fremont | Oct. 17, 1972 |
| 3,716,025 | Lawson | Feb. 13, 1973 |
| 3,730,142 | Kahrs et al. | May 1, 1973 |
| 3,804,063 | Finger | April 16, 1974 |
| 4,137,869 | Kipping | Feb. 6, 1979 |
| 4,235,198 | Goguel | Nov. 25, 1980 |
| 4,257,350 | Streichenberger | March 24, 1981 |
| 4,312,296 | Stelleman et al. | Jan. 26, 1982 |
| 4,351,269 | Rines et al. | Sept. 28, 1982 |
| 4,380,213 | Blair et al. | April 19, 1983 |

SUMMARY OF THE INVENTION

The invention is directed to an apparatus for raising fish in an enclosed environment in natural waters comprising: (a) means for enclosing and maintaining the fish in a confined location in naturally occurring waters; (b) means for feeding the fish within the enclosing means; (c) means for monitoring life signs, weight gain and disease in each fish retained in the enclosing means; and (d) means for maintaining an air pocket within the enclosing means. The invention also includes means for culling the fish within the enclosing means.

The invention is also directed to a method of rearing fish in a confined natural water environment which comprises: (a) positioning fish confining means in a natural body of water at a location which optimizes the health and weight gain rate of the fish confined in the confining means; (b) supplying fish feed to the confining means; (c) determining the temperature and salinity of the water in which the confining means is positioned; and (d) moving the confining means as required to optimize fish rearing conditions.

This invention is directed to a method and apparatus for promoting or retarding, as desired, environmental factors such as temperature, salinity and turbidity in natural fish bearing salt waters such as the Georgia Strait of the west coast of Canada. Typically, the salt waters of the Georgia Strait comprise a warm semi-fresh water lens which is fed by rivers from the mainland. The lens tends to remain on the surface while cold high salinity water is found at greater depths. Typically, salmon in nature surface to feed on herring and other small fish which in turn feed on zooplankton which thrive in these halocline waters. The brackish surface water is, however, potentially dangerous and unhealthy to salmon if they are held there against their will.

Knowledge in retarding microorganisms' growth by reducing the temperature below 16° C. or by varying the depth of the pen in such a way as to arrive at a constant and optimum temperature and salinity for the fish represents a new means of controlling disease as opposed to traditionally using prophylactic doses of antibiotics which themselves are challenged by antibiotic resistant bacteria strains.

The present invention relates to methods and apparatus for fish farming physostomous fish (salmonids) which require access to surface air. Such fish must swallow surface air to control their air bladder and maintain equilibrium.

The submersible sea pen in some aspects utilizes in natural waters some of the techniques and knowledge which have been developed by aquariums and fish hatcheries in maintaining water quality and nutrition in a healthy environment for public viewing.

Objectives of the air-bell sea pen are to:
1. Reduce labour cost by mechanization;
2. Lower maintenance cost by being submersible.
3. Reduce overall stress on the fish by maintaining a critical course in temperature and salinity or water quality.
4. Increase feed to product conversion ratio by at least five percent and possibly more by manipulating the photoperiod during a zooplankton bloom thereby maintaining fresh natural feed. The inventor believes that it is the rancidity level of normal processed diets used in existing fish pens that is the main reason for breakdown of the fish's immune system which then results in the fish contracting a disease.
5. Provide apparatus to assist the fish farmer in isolating other symptoms of stress that inevitably break down the natural immunity of the fish and contribute to disease and fish loss. All diseases are present in the natural environment. The fish farmer must therefore concern himself with eliminating the causes of stress in order to reach equilibrium. The fish's immune system should function properly, which in turn should eliminate or reduce the need for most drug therapy.

The submersible sea pen is intended to address and minimize the following stress factors:
1. Water temperature (high water temperatures increase disease probability);
2. Salinity (varies according to smolting requirements and provides a control over disease);
3. Turbidity (stress and suffocation);
4. Fresh diet (food free of any rancidity). A fresh diet during the zooplankton bloom should dramatically improve the fishes' growth rate. Secondly, by having the fish fully develop a functional immune system, it is anticipated that the process diets and antibiotics requirements should be reduced.

The air-bell dome protects the upper surface of the pen from sunlight. The dome provides a shelter of shade whereby the fish feels protected from surface predation and sunlight. Sunlight can burn the backs of the salmon on a hot summer day if the pen is too close to the surface. Surface pens have this problem.

The pen's normal depth of twenty feet of sea water and the shade protection provided by the dome should reduce fouling of the pen for prolonged periods. As the submersible pen is positioned beneath the surface of the water, it is less affected by weather, resulting in less mechanical stress on the structure. Therefore, the cost of the structural portion of the sea pen and maintenance is considerably reduced compared to a standard surface pen. This is particularly true where there is a strong current which opposes the wind. Such counter forces can result in considerable damage to any surface structure. Ironically, such counter force locations which enrich the surface water with important carbon dioxide (which is necessary to phyloplankton bloom) are often the feeding pastures of salmon.

The pen can be placed in highly exposed areas, where natural feed thrives. The submersible pen is directed to providing supplementary feed which will reduce processed diet cost. The highly exposed areas with variable salinity along irregular shore lines in which the sea pens are submerged are the home of the zooplankton which is a fresh diet rich in vitamins and fatty acids. This provides the best and most natural treatment for preventing liver and kidney degeneration. The frequently fresh diet will eliminate or reduce other problems like the protozoan Ceratomyxa Shasta. The pen has the inherent capability of being located where there is notably cold deep upwelling of nutrient-rich waters and strong winds and currents which exchange life giving gases at the air-water interface. Secondly, water current reduces the thickness of the thin layer of dead water which typically surrounds the body of a fish. A thin water mantle about the fish promotes the health of the the fish by enhancing respiration, ingestion and waste elimination. Upwelling and turbulence are the two primary determinants for survival of salmon at sea or in salt water rearing pens. These rough water locations are not suitable for standard surface pens.

DRAWINGS

In the drawings which depict a detailed embodiment of the invention.

DESCRIPTION OF A SPECIFIC EMBODIMENT OF THE INVENTION

Figure 1:
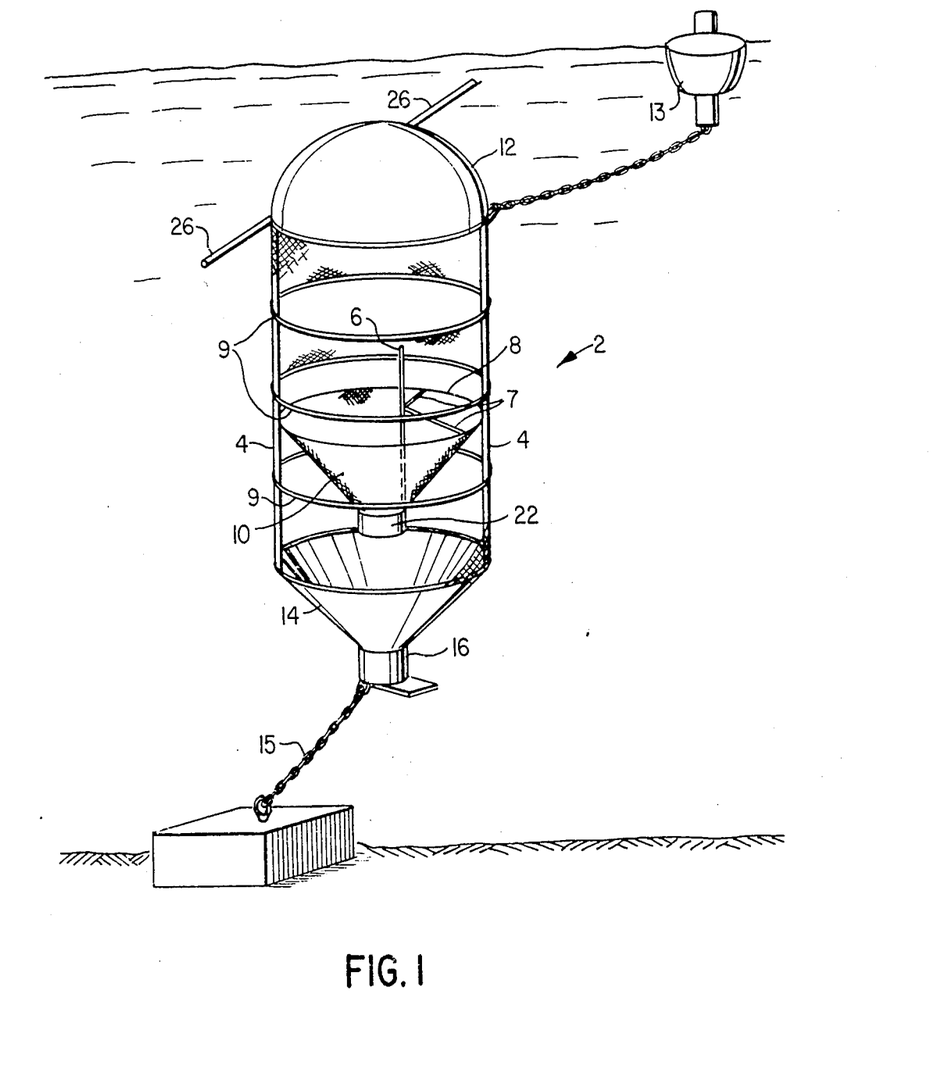
FIG. 1 depicts in side perspective view the sea pen submerged in operating position.

Referring to the drawings, FIG. 1 depicts in side perspective view the sea pen submerged in fish rearing and feeding position. The sea pen is constructed in the shape of a vertical barrel and typically measures 30 feet in diameter and 60 feet in height. The walls of the sea pen are typically nylon netting with 1½ to 2 inch openings. This allows sea water to circulate freely through the sea pen 2. Located on each side of the sea pen 2 in vertical orientation are a pair of elevator rods 4 which are constructed of rigid material and enable the culling screen 8 of the sea pen 2 to be raised and lowered within the interior boundaries of the sea pen 2. The electric elevators for raising and lowering the screen 8 are electrically operated from a remote control station which will be discussed below. A buoy 13 is secured to the top portion of the sea pen 2 by a chain. Standard Coast Guard identification is affixed to the buoy 13.

The top of the sea pen is constructed in the form of a dome 12 which is impermeable to air. This holds an air pocket which can be accessed by fish swimming within the interior of the sea pen 2. The interior of the circular shaped culling ring typically contains a netting 10, which in FIG. 1, is shown in lowered position. One or more support rings 9 are distributed through the length of the pen 2 to ensure that it holds its cylindrical shape throughout. Also, the pen 2 can be weighted to ensure that it remains upright.

A fish trap 16 is located at the bottom of funnel 14 at the bottom of the sea pen 2. This trap 16 enables dead or sick fish to be removed from the interior of the sea pen 2. The sea pen 2 is held in submerged position by the anchor and chain 15.

Mounted vertically within the interior of the culling ring 8 is a second elevator shaft 6 which is secured to the culling ring 8 by support rods 7. A moveable fish locate camera 18 (hidden) is mounted on the second elevator shaft 6 in the interior of the culling ring 8. This camera can be raised and lowered along the vertical length of the elevator shaft 6. The direction of the camera 18 can also be moved upwardly, downwardly and laterally from a remote position, in order to view specific fish in the interior of the sea pen 2. Camera 18 is accompanied by an array of fish darts 20, which can be used to either inoculate specific fish with medicinal agents, or puncture floating dead fish so that they will sink to the bottom of the sea pen 2. The camera 18 and darts 20 can be seen in more detail in FIG. 5a.

Figure 1A:
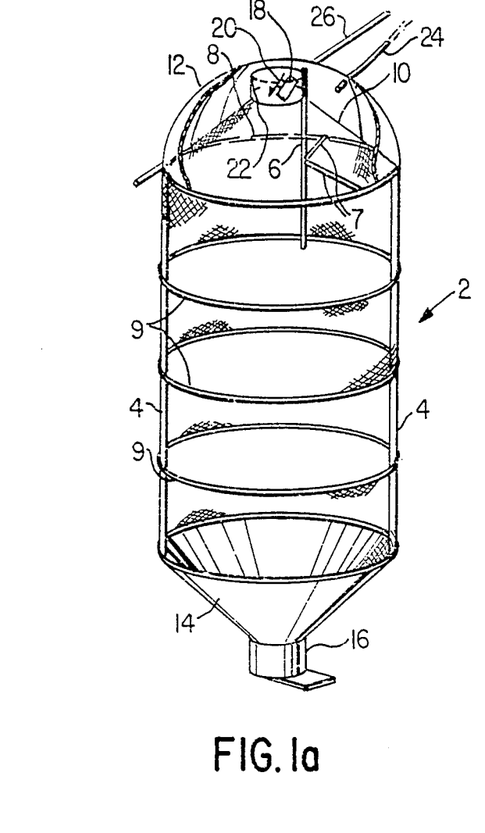
FIG. 1a depicts in side perspective view the sea pen with the viewing camera and culling net raised to the top rest position of the pen.

As seen in FIG. 1a, in normal operating rest position, the sea pen has the culling ring 8 located at the uppermost position. The net 10 is drawn upwardly in a truncated conical orientation by a third elevator shaft (not shown) which raises or lowers the net 10 and fish barrel 22 relative to the culling screen 8. The camera 18 and darts 20 are located above the surface of the water in a large air bubble which is present inside the dome 12. The air bubble is maintained by means of compressed air which is pumped into the sea pen under the dome 12 through compressed air supply line 26. When the net 10 is drawn into an upwardly conical position, the water-air interface of the water and air bubble is below the top end of the net 10 and accordingly, fish in the interior of the sea pen 2 can swim freely within the majority of the interior of the sea pen 2. When necessary, the fish can swim to the water-air interface in order to gulp air as required to replenish their air bladders and thereby keep the fish in equilibrium. Feed for the fish is supplied through the upper end of the dome 12 by means of feed supply line 24. The food drops through the interior of a fish barrel 22 which is positioned within the interior of the top end of the net 2 (not shown in FIG. 1a).

Figure 2:
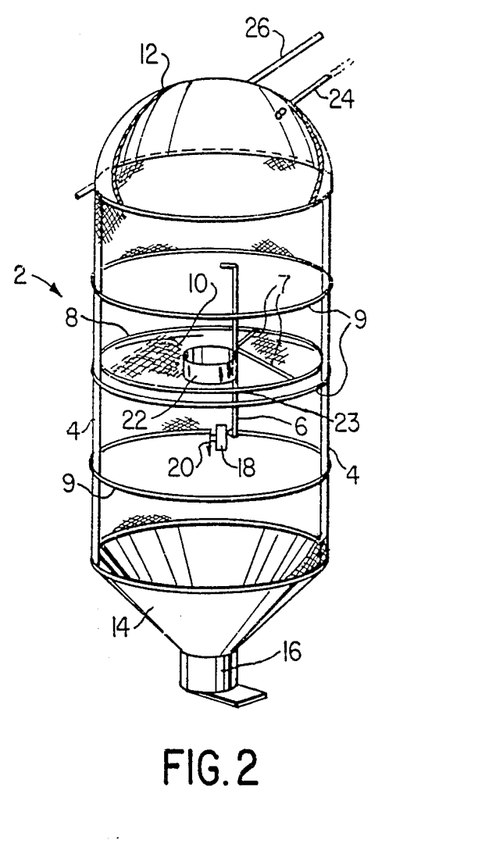
FIG. 2 depicts in side perspective view the sea pen in an intermediate fish culling position.

FIG. 2 depicts in side elevation view the sea pen 2 in an initial fish culling position. As can be seen in FIG. 2, the culling screen 8 has been lowered along elevator shafts 4 to a mid-position in the interior of the sea pen 2. The net 10 is arranged in approximately a planar manner, with the fish barrel 22 located in the central area of the net ring 8 and net 10. The fish barrel 22 and net 10 are moved upwardly or downwardly by third elevator 23. The directional and moveable fish viewing camera 18 has been lowered independent of barrel 22 along second elevator shaft 6 to a position below the vertical fish barrel 22. In this position, low intensity lights which will be explained below, are turned on. The fish are trained to appreciate that when the low intensity lights are turned on, feed will be supplied to the top region of the sea pen 2 through feed supply line 24. Hence the strongest and healthiest fish swim upwardly through the barrel 22 first. A moveable aperture which can be adjusted to provide a specified opening is located at the bottom region of the barrel 22, as will be explained below. After most of the fish, typically the stronger and healthier fish, have migrated upwardly through the fish barrel 22, the weak and sickly fish still remain behind in the lower region of the sea pen 2. When the fish population has been thinned out, the directional camera 18 can be remotely operated to view specific undersized or weak fish. Depending upon the condition of those fish, as individually viewed, they can either be killed or inoculated with appropriate antiobiotics and the like by means of darts 20 which from a remote position can be fired at the particular fish in question. The moveable directional camera 18 enables the remote operator to ensure that the specific fish required is appropriately penetrated by the dart which is fired. The dart 20 can be fired by compressed air or some other suitable mechanism.

Underlining the concept of this invention is a phenomenon of fish as reported in P. V. Mikheyev, A. V. Meysner of the All union Pond Fisheries Moscow Province: "The importance of contact with the air in the life of a rainbow trout. As a result of the lack of opportunity to fill the swim bladder with air, the fish attempts to reach the surface, loses the coordination of its movements and swims on its side and finally lies on the bottom, when the fish lie for a long time on the bottom they form sores and ulcers causing mortality."

To provide a means for a fish to replenish its air bladder, it is therefore imperative that the submersible be equipped with an air pocket at the top (an air-bell) to assure that equilibrium requirements of the fish can be met.

Further observation demonstrates that a young salmon comes to the surface, gulps air and then returns to a vertical position to swallow. It has been learned that air is passed from the esophagus through the sphincter and into the swim bladder. Experiments have been conducted by inserting a syringe into the swim bladder of the fish. The fish consequently releases air and loses equilibrium. The fish is forced to return to the surface to again gulp air in an attempt to regain its equilibrium.

The submersible sea pen in some aspects utilizes in natural waters some of the techniques and knowledge which have been developed by aquariums and hatcheries in mintaining water quality and nutrition requirements of fish and thereby simulating as natural an environment as possible.

Salmon in nature normally do not stay in shallow waters after feeding. The inventor believes that holding the fish in shallow waters results in many simultaneously occurring cumulative stress factors such as:
1. Unsuitable temperature, salinity and turbidity.
2. Noise of surface waters against the holding apparatus, particularly when there is a storm. Above water surface noise is also transmitted into the waters since water is a good conductor of sound.
3. Higher light intensity.
4. Fear of surface predation.
5. Low surface water pressure. It is suspected that the higher pressure of deeper water plays an important role in salmon health.

The sea pen will take otherwise poor sites in terms of surface temperature, salinity and turbidity and make them suitable. Due to river outflow, there is a fresh water lens that exists above the sea water. This lens tends to warm up in the summer. This brings surface water temperatures in excess of 20° C. in the Strait of Georgia which exists between the mainland and Vancouver Island on the west coast of Canada. This warm brackish water in the summer months is harmful to the rearing of fish in surface sea pens. However, the interface is also the area in which zooplankton thrive. It is the inventor's belief that salmon which are hatched in fresh water travel to the ocean to seek abundant fresh food that is free of rancidity (which is necessary for proper immunity protection) in the form of zooplankton and small fish which are found in shallow waters. The fish, once they have fed, return to deeper, colder water for comfort.

The fish raising process is operated in the following manner:

Feeding

Figure 10:
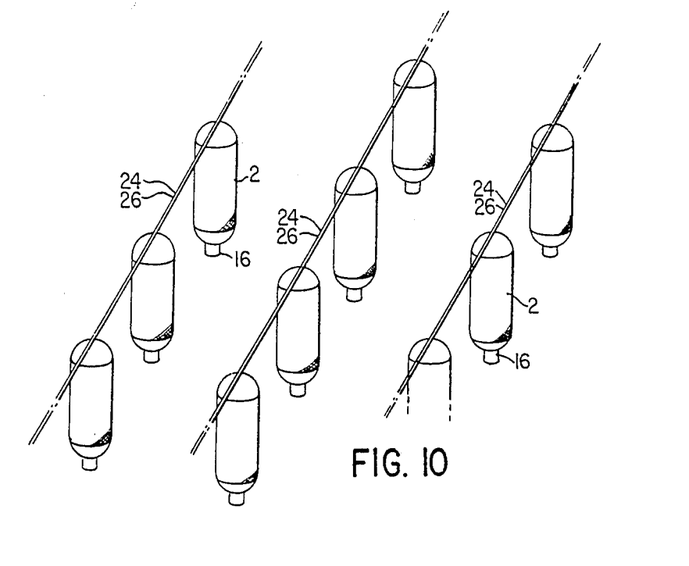
FIG. 10 depicts a perspective view of a number of sea pens deployed in a grid pattern in natural waters.

Proportioned feed is pumped throughout the day into the pens through the supply tubes (see grid system depicted in FIG. 10). The feed spilling into the air-bell creates a flushing current. Feeding in this manner is combined with a sound and light system which is attractive to the fish in the pen and alerts them that feeding time has arrived. A mild electric current rod which attracts fish is also used. The rod also assist in conditioning the larger stronger fish to rise to the air-bell surface first, which assists in the fish culling process. The optimum amounts of food are determined and programmed into a computer. The operator bulk-loads the feed into the feed silo. An electric motor is used to turn a paddle which drops feed into the supply line. This feed is then flushed by means of an assist pump into the pens. When feeding has commenced, the operator turns on the monitor camera and can thereby determine how much feed the fish are eating or how much is falling throug the pen to the bottom trap. Specimens of the nitrates collected in the trap provide additional data for analysis.

Predation

An amplified sound alarm and whale tunes are used to deter fish predators such as seals. The bottom cone and the top bell of the pen are solid membranes. The sides of the pen are covered with netting which is tightly stretched to avoid folds. A dead fish trap is located at the bottom of the pen and is used to remove dead fish. The dead fish trap is designed to deter bud sharks which may be attracted to the fish feed.

Water Quality

Compressed air is supplied to the air pocket at the top of each sea pen. The design of the sea pen enables the fish to surface to the air pocket as required to equilize their swim bladders. Air also serves a secondary purpose in that it acts as buoyancy compensator for the pen. Air pumped to the pen is used to raise or lower the pen to different sea depths as required to enable the sea pen to remain within required sea water temperature and salinity limits.

Culling

A separation or culling net is placed in the interior of the pen. The net is raised or lowered by an elevator motor which is controlled remotely by an operator at the control station. The video monitor camera and barrel are also raised and lowered by two elevator motors which are also remotely operated by the operator. In operation of the sea pen, the fish are concentrated into the bottom of the pen by lowering the culling net. The fish are then counted as they swim upwardly through the barrel to reach the top region of the sea pen. A controllable variable size aperture in the barrel allows the fish to pass one at a time through the aperture. The fish are conditioned to swim to the top of the sea pen where they think they will receive food. As they pass through the barrel they trigger a beam of light that counts and identifies the fish. A video tape recording is made of the fish as they pass through the barrel. The operator may then play back the tape slowly to determine the physiology of each particular fish. The larger and more aggressive fish will swim upwardly through the barrel first. The smaller and weaker fish will normally be left in the bottom of the sea pen. The aperture can then be closed. The pan and tilt camera can then be used to study the remaining weak and smaller fish in a reduced area. A decision can then be made as to the reason for the smaller or weaker fish. If a fish dies, it will fall into the trap below. If the dead fish floats, it is shot with a weighted dart which is operated by the pan and tilt camera. The dart ensures that the dead fish sinks into the trap at the bottom for removal. The principal advantage of the culling process is that weak and dead fish are removed from the school of healthy fish on a frequent basis which in turn reduces the stress on the healthy fish. Healthy fish will eat unhealthy fish and thereby ingest any disease organisms which might be present in the diseased fish. Absence of stress by meticulous culling promotes weight gain of the healthy fish.

Telemetry

Sensors for temperature, salinity, dissolved oxygen, phosphorus, nitrate, pH, current and depth pressure are remotely monitored and graphed at the operator station. The pan and tilt camera are used for identifying stressed fish. The two monitor cameras in the barrel view the fish as they swim through the barrel and send a VHF signal to a computer at the operator station. The computer digitalizer analyses the horizontal and vertical pictures and converts the electric signal into two (512,512) binary arrays. The computer then counts the number of black spots in the arrays, computes a function and determines the daily weight gain for each fish. Each fish is individually identified and thus a history for each fish can be maintained.

Harvesting

To remove fully grown or market size production fish, the culling screen, with the aperture closed, is raised from the bottom of the sea pen. This forces the fish to collect at the top of the sea pen. The air bell can then be removed. The fish can then be removed from the pen by using standard fish harvesting techniques. Alternatively, the fish can be forced to swim out the bottom trap into a shipping cage which is attached to the trap. The shipping cage full of fish can then be transported to shore for processing.

Dimensions

The volume of the pen (15 feet radius and 60 feet depth) is about 50,000 cubic feet, which is sufficiently large to house 10,000 fish of up to 2.5 to 3 lbs. in weight. It is assumed that a typical net of the pen, because of the resistance to fouling, can be used for about eight years which is twice the life of a standard surface pen. This should amount to the production of 25,000 lbs. of fish per year for eight years, a total of 200,000 lbs. of fish before the sea pen must be refurbished.

Figure 3:
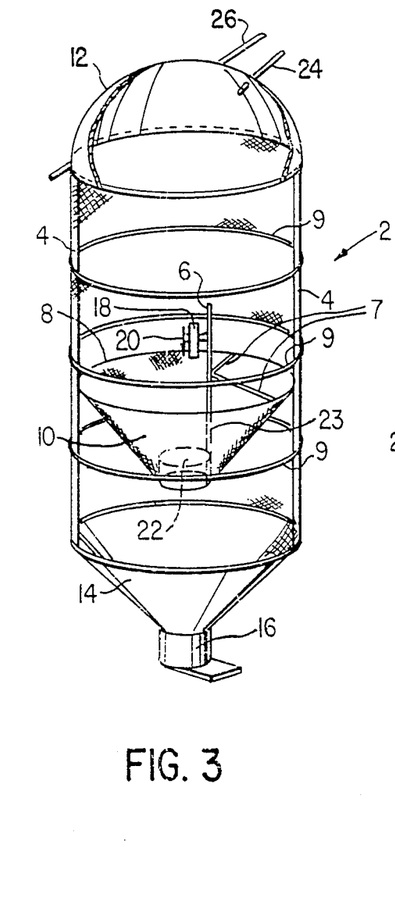
FIG. 3 depicts in side perspective view the sea pen in a latter stage culling position.

FIG. 3 depicts in perspective view the sea pen in fish culling position, similar to that shown in FIG. 2, except that the culling net 10 has been drawn downwardly into an inverted truncated conical position by the barrel elevator control. The fish barrel 22 is positioned at the lower end of the elevator shaft 6. The moveable camera 18 and darts 20 are positioned at an upper region of the elevator shaft 6. In this orientation, the directional camera 18 can be utilized to monitor fish swimming in the upper region of the sea pen 2.

Figure 4:
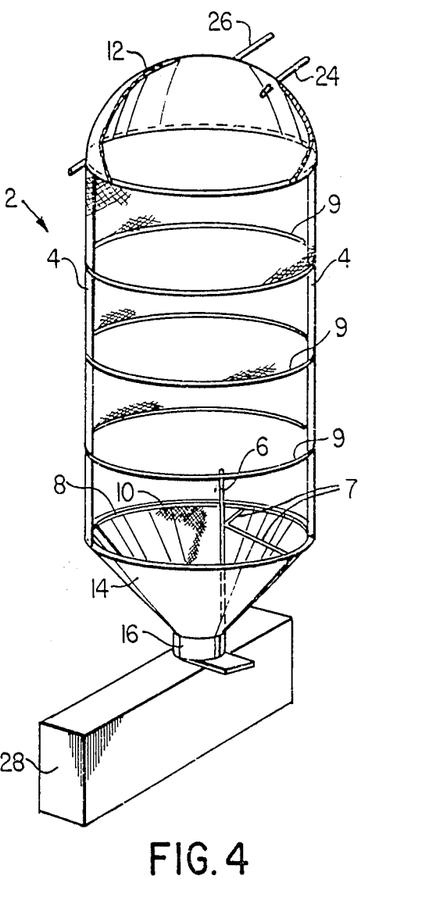
FIG. 4 depicts in side perspective view the sea pen in a fish harvesting position.

FIG. 4 illustrates in perspective view the position of the sea pen 2 when the fish from the interior of the sea pen 2 have been harvested. The culling ring 8 is moved to the lowermost position on the elevator shafts 4 and the net 10 is drawn to the lowermost region of the second elevator shaft 6. This forces the fish to swim downwardly through the trap 16 into a shipping box 28, which is located below the fish trap 16. The shipping box 28, full of fish, is then closed and taken away to dockside by a typical fishing boat for processing.

The sea pen 2, as illustrated in FIGS. 1 through 4, is typically submerged at a depth of 20 to 30 feet at the interface between the fish and salt water halocline, and is held in place by an anchor and chain 15. Depending upon water salinity, temperature, plankton concentrations, and other conditions, the sea pen 2 can be raised or lowered or towed to another site as required in order to locate the sea pen 2 in an optimum fish rearing environment. The depth of the pen 2 may be varied throughout the year as required for optimum fish rearing.

Figure 5:
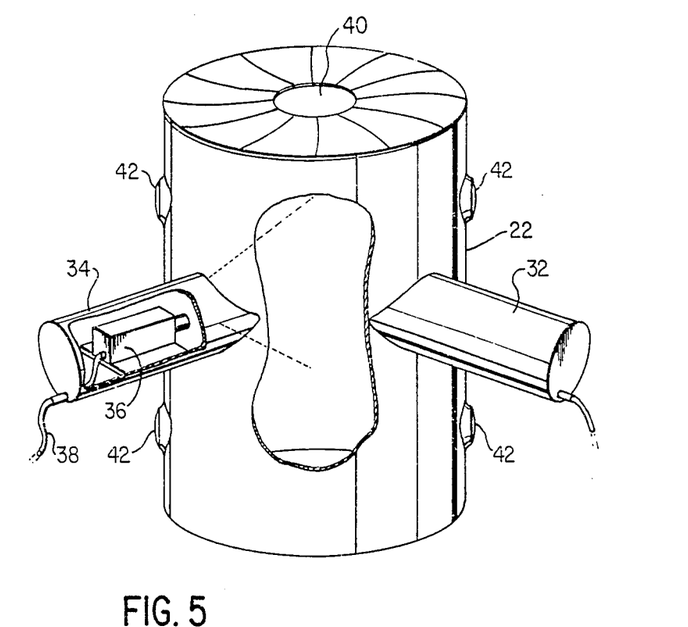
FIG. 5 depicts in side perspective view a detail of the two monitoring cameras and the aperture barrel.
Figure 5A:
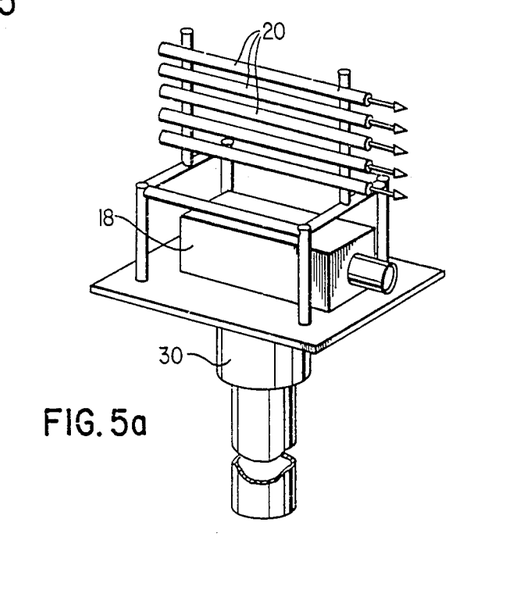
FIG. 5a depicts in side perspective view a detail of the directional fish viewing camera and dart array.

FIGS. 5 and 5a illustrate detailed perspective views of the fish barrel 22 and the directional camera 18. The moveable camera 18, and darts 20, are mounted on a tilt and pivot platform 30, which can be remotely operated electrically. The fish barrel 22 is constructed so that it has a vertical hollow cylindrical shape. Typically, the fish barrel 22 will measure 4 feet in diameter. The barrel 22 is equipped with a pair of horizontally and radially disposed aluminum canisters 32 and 34, which respectively house a pair of fish monitor cameras 36. In FIG. 5, only the camera 36 mounted internally within canister 34 is shown, The camera 36 is a typical video tape camera. Electrical signals from the camera 36 are transmitted to a remote operating station through camera cable signal outlet 38. Also positioned at four points at upper and lower regions of the barrel 22 are low intensity lights 42, which can be turned on from a remote position in order to signal to the fish that feed is being pumped into the top-interior region of the sea pen 2 through feed supply line 24. The fish, reacting to the signal, swim upwardly through the interior of the barrel 22. A moveable diaphragm 40, with an aperture opening which can be altered in diameter is located at the bottom end of the barrel 22. The size of the aperture 40 in the diaphragm can be remotely adjusted in order to control the number of fish which can migrate upwardly through the fish barrel 22 in a given time. In this way, each fish can be monitored by means of the two cameras 36 mounted within the interior of the two canisters 32 and 34. Signals from each camera 36 are transmitted separately to a remotely stationed computer for assimilation. Typically, the video camera 36 has a wide angle lens with a wide lens opening so that it can operate effectively in low intensity light. The signals obtained by the pair of video cameras 36 are recorded on VHF video tape and can be played back in slow motion on a video display terminal for viewing and reviewing by the operator at the remotely located operating station.

Figure 5B:
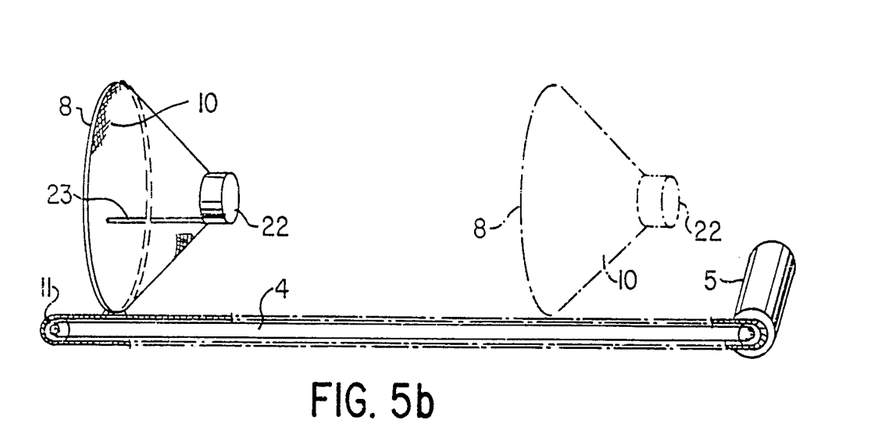
FIG. 5b depicts a side perspective view of the culling net and elevator apparatus.
Figure 5C:
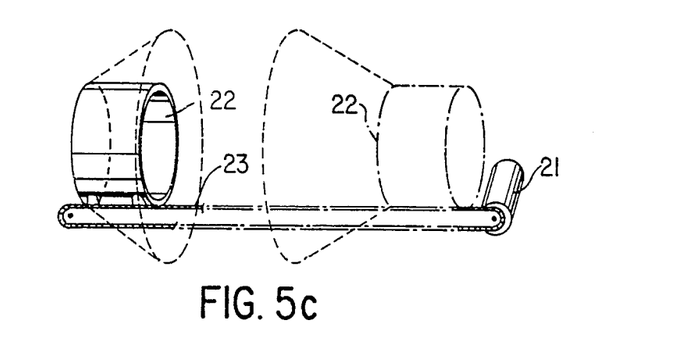
FIG. 5c depicts a side perspective view of the barrel and elevator apparatus.
Figure 5D:
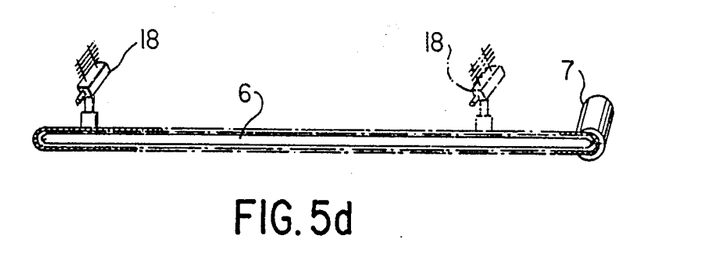
FIG. 5d depicts a side perspective view of the monitor camera and elevator apparatus.

FIG. 5b illustrates in detail how the barrel 22 and net 8 are raised and lowered. A submersible motor 5 which is remotely controlled draws a cable around pulley 11 to achieve the movement. FIG. 5c illustrates how barrel 22 is raised or lowered along track 23 by remotely controlled submersible motor 21. FIG. 5d illustrates remotely controlled submersible motor 7 which is used to raise or lower camera 18 along track 6.

Figure 6:
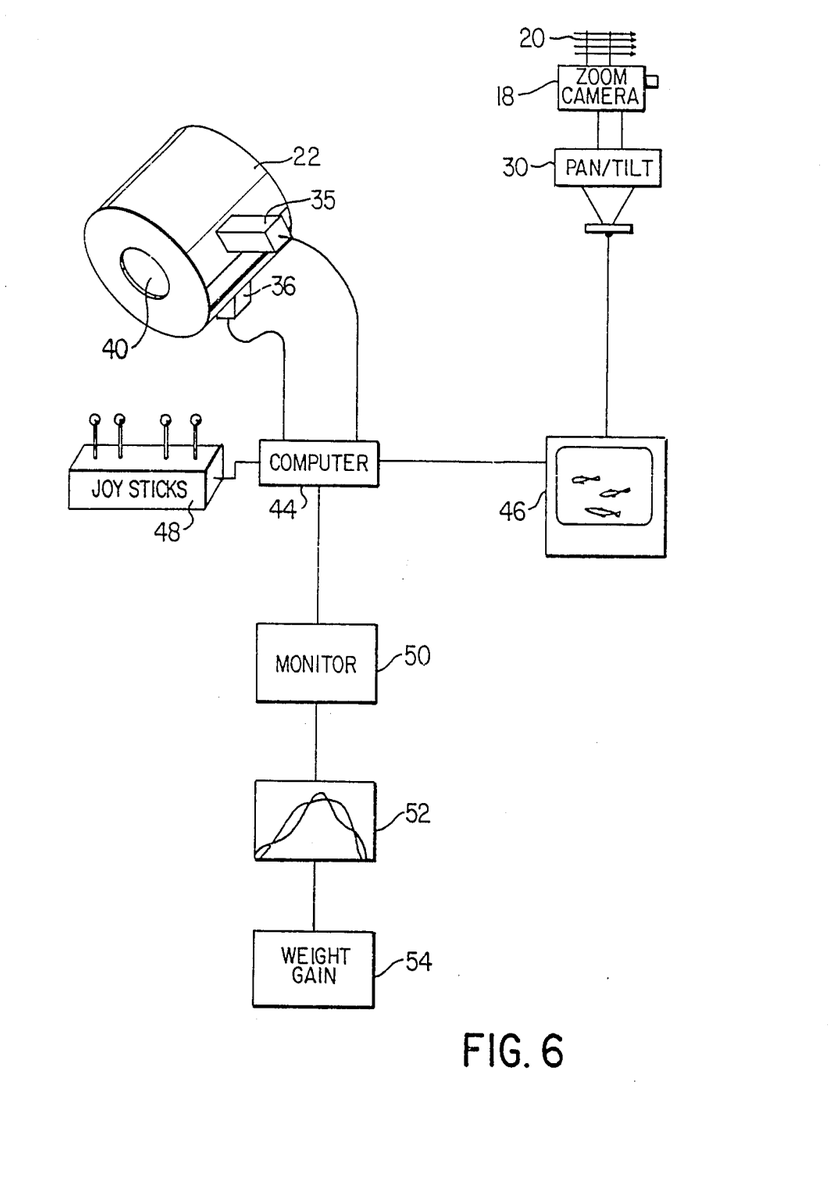
FIG. 6 depicts a schematic of the relationship of the sea pen fish monitoring equipment.

FIG. 6 depicts a schematic of the relationship of the fish monitoring equipment in the interior of the sea pen 2 and the remote terminal station. Images of fish, usually sick or undersize fish, received through moveable camera 18, mounted on tilt and pivot platform 30, are transmitted through a cable and displayed on a televised picture screen 46. The operator at the station can then determine whether or not a particular fish should be inoculated in order to promote weight gain, or remedy a particular disease which the fish in question may have. Alternatively, if the fish in question is terminally ill, a decision can be made whether the fish should be exterminated. The signals depicted on picture screen 46 are relayed to a computer 44.

Likewise, data received by first camera 35 and second camera 36, mounted inside the canisters 32 and 34 on the fish barrel 22, are transmitted separately to computer 44. By means of a digitalizer, the computer stores the information from cameras 35 and 36 which can be displayed on a monitor 50 and viewed by the operator. A graph of weight gain for each fish can be printed out in the form of graph print-out 52. Likewise, a 512—512 weight gain tabulation is printed out as a weight gain print-out 54. The computer 44, tilt platform 30, directional camera 18, aperture 40, barrel 22, and culling screen 8, and other operational parameters, can be controlled by means of key boards, buttons and joy sticks at operating station 48 by the operator.

Figure 7:
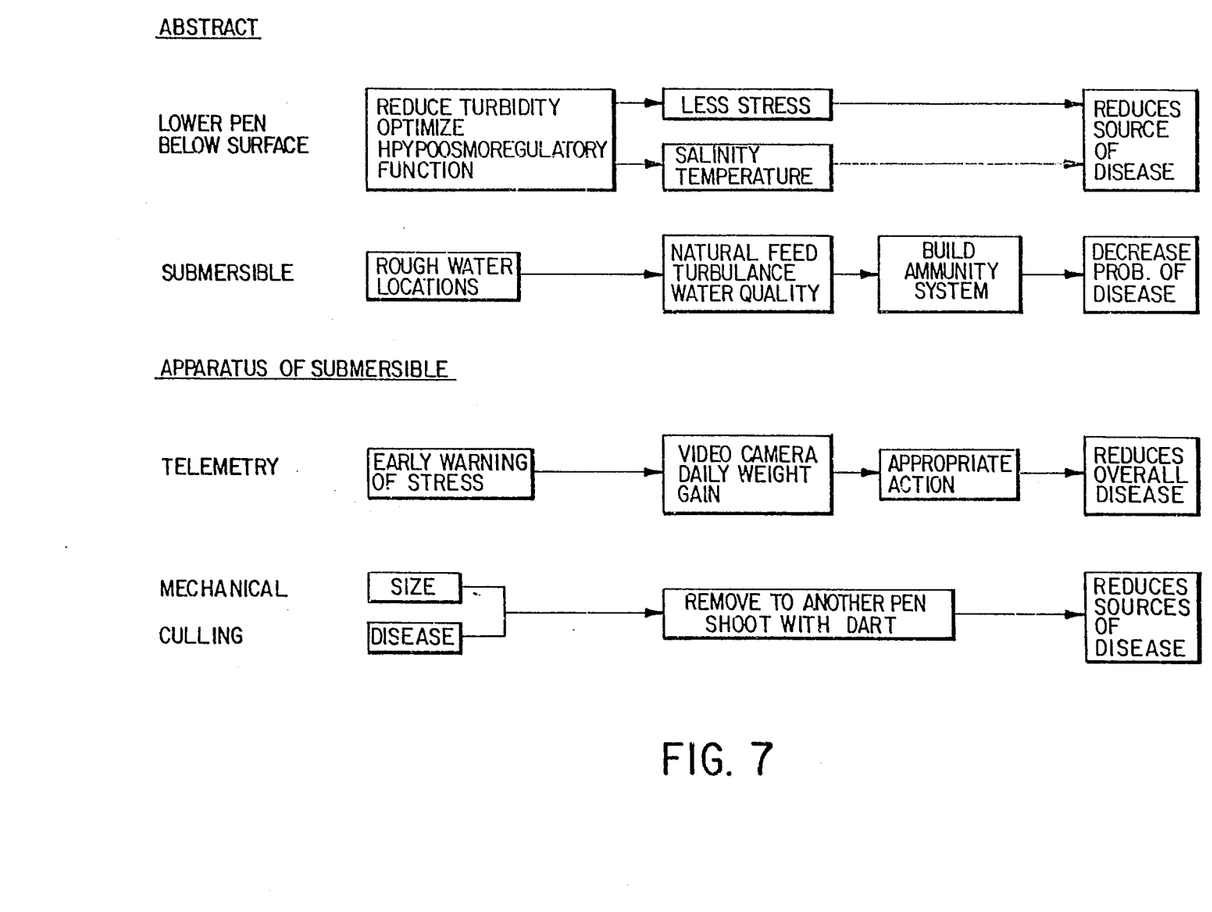
FIG. 7 depicts a schematic of the manner in which various components and variables associated with the sea pen lead to control of operating criteria and reduced incidence of fish disease.

FIG. 7 depicts a schematic of the manner in which various components and variables associated with the sea pen 2 can be monitored and controlled in order to maximize fish rearing conditions and reduce the incidence of fish disease and death. By positioning the pen 2 at an appropriate depth in the natural sea water at the suitable halocline, turbidity is reduced, which in turn reduces sediment build-up on the gills of the fish. This in turn reduces the chance of bacterial gill disease occurring. Likewise, when salinity, temperature, current, and the like, are monitored and controlled to optimum conditions, the incidence of fish disease is reduced.

Since the sea pen is submersible to a predetermined depth, rough, distracting and stress causing surface water is avoided. Also, less dense fresh or brackish surface water, which typically collects at the surface, is avoided. Since the sea pen 2 is submerged to an optimum depth, plankton and the like which naturally bloom at the halocline interface are present in the water and are flushed through the interior of the sea pen. These optimum conditions contribute to the build-up of a healthy immunity system in the fish.

Finally, the telemetry system of the sea pen 2 and accompanying apparatus, including moveable camera 18, and monitoring cameras 35 and 36, provide an early warning of fish disease, and underdeveloped fish, neither of which is possible today with existing surface water fish farms. Furthermore, since each fish is coded with an appropriate tag, appearance, or some other indicia, the weight gain of each fish can be monitored on a daily basis. Sickly fish, or fish which are not developing at the prescribed rate, and which cause stress in other healthy fish, can be treated appropriately by means of medicaments or removed to another pen. If a fish does not respond and dies, it can be eliminated from the interior of the pen through the fish trap 16. Again, the sophisticated monitoring and electronic equipment enables maximum weight gain and fish production for the sea pen 2.

Figure 8:
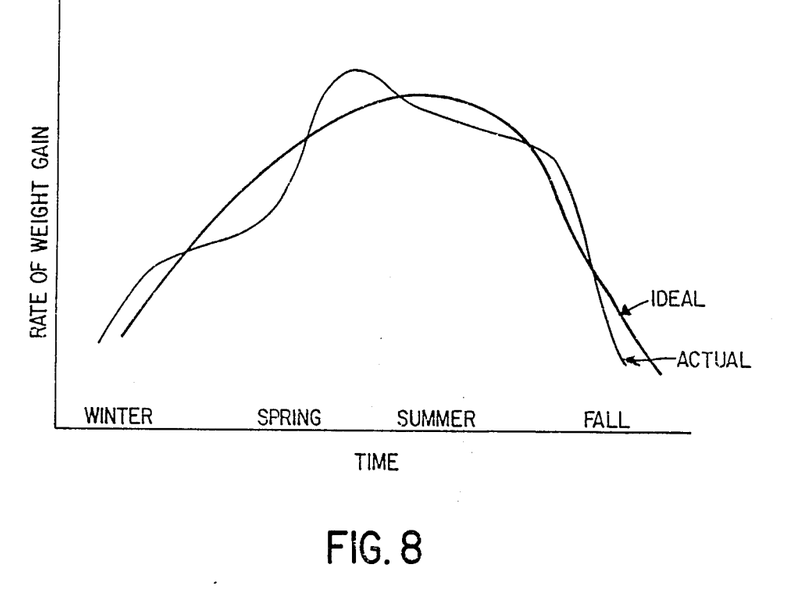
FIG. 8 depicts a plot of rate of individual fish weight gain over a period of one year.

FIG. 8 depicts a plot of the rate of fish weight gain over a period of one year, as obtained for each fish monitored by means of cameras 35 and 36 as they swim upwardly through the interior of fish barrel 22. The ideal curve is in the form of a smooth arc. However, in practice, rate of weight gain will be uneven, depending upon stress causing agents such as seals, or bloom of plankton which enhances rate of weight gain.

Figure 9:
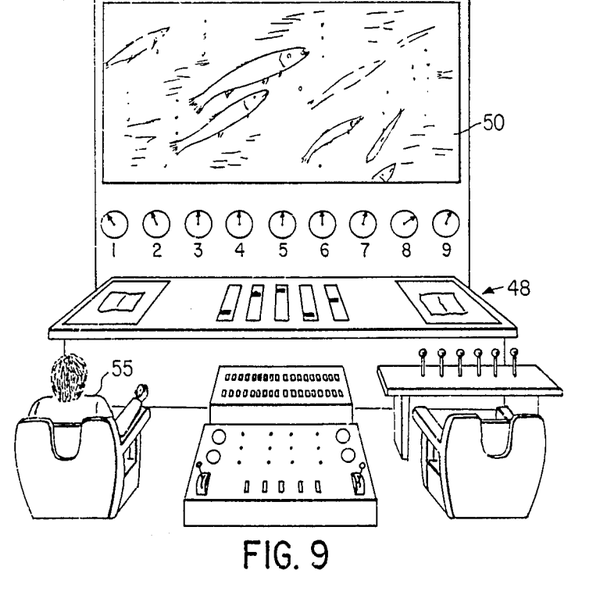
FIG. 9 depicts a perspective view of the remotely stationed control panel for the sea pen.

FIG. 9 depicts a perspective view of a typical control panel which includes monitor screen 50, the joy stick station 48, various operating buttons and dials, and a conventional computer keyboard 53. These permit the operator 55 to monitor the various important operating criteria for the sea pen 2 from a remote position and to make adjustments as appropriate.

Finally, FIG. 10 depicts a perspective view of a number of sea pens 2 deployed in a grid pattern in natural waters, such as those which exist in the Georgia Strait between the mainland and Vancouver Island on the west coast of Canada. The array of sea pens 2 are connected together by means of supply lines 24 and 26 which can supply food and compressed air to the various sea pens 2. Also, while each particular sea pen 2 is equipped with individual cameras 18, 35 and 36, and the like, they are all fed by common supply lines and are controlled from a single remotely positioned operator station.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. Apparatus for raising fish in an enclosed environment in natural waters comprising:

(a) means for submersibly enclosing and maintaining the fish in a confined location in naturally occurring waters at variable depths;
    (b) means for feeding the fish within the enclosing means;
    (c) camera and remotely located monitor means for viewing and monitoring the rate of growth of each fish retained in the enclosing means;
    (d) means for maintaining an air pocket within the enclosing means; and
    (e) means for non-disruptively culling the fish within the enclosing means and causing the fish to swim individually in an orderly manner so that they can be viewed and monitored by the camera and monitor means.

2. An apparatus as defined in claim 1 wherein means for ejecting fish from the enclosing means is provided.

3. An apparatus as defined in claim 1 wherein the enclosing means has water permeable walls which enable water to circulate freely into and out of the enclosing means.

4. an apparatus as defined in claim 3 wherein the top portion of the confining means is impermeable to air and is capable of retaining an air pocket therein.

5. An apparatus as defined in claim 1 wherein the camera means is a video camera which can be directionally aimed at a specific fish on the monitor means which is a television monitor screen and a recording of the image is made on a video cassette recorder.

6. An apparatus as defined in claim 5 wherein the directional camera is accompanied by one or more projectile means which can be fired at a specific fish for the purpose of inoculating the fish with a medicinal substance or terminating the life of the fish.

7. An apparatus as defined in claim 5 wherein the camera is controlled from a remote position.

8. An apparatus as defined in claim 5 wherein the camera is mounted on an elevator means which operates in association with the culling means and enables the directional camera to be raised and lowered relative to the culling means and the enclosing means.

9. An apparatus as defined in claim 8 wherein the enclosing means is secured to an anchor and a retaining means which enables the enclosing means to be positioned at a specified depth in a natural body of water.

10. An apparatus as defined in claim 9 wherein the enclosing means is equipped with sensing means for measuring salinity, turbidity and temperature of the water in which the enclosing means is positioned.

11. An apparatus as defined in claim 10 wherein a plurality of the enclosing means are arranged in a pattern in a natural body of water, the plurality of enclosing means being connected to and supplied by a single feed supply line and a single air supply line and operating criteria in each enclosing means are monitored and controlled from a single remotely positioned operator terminal.

12. An apparatus as defined in claim 1 wherein the culling means includes an enclosure through which fish being culled can swim in an orderly manner.

13. An apparatus as defined in claim 12 wherein the enclosure is equipped with at least one camera which can make an image of each fish as it swims in an orderly manner through the enclosure.

14. An apparatus as claimed in claim 13 wherein the enclosure is equipped with two cameras, the first camera being arranged relative to the second camera so that a three dimensional image of the fish can be obtained.

15. An apparatus as defined in claim 14 wherein the information received by the camera is transmitted to a digitalizer and the information is stored in a computer which is programmed to make a weight calculation of the specific fish being viewed by the camera and calculate periodic weight gain of the fish being viewed.

16. An apparatus as defined in claim 12 wherein the culling means comprises a water permeable membrane which can be raised and lowered within the enclosing means.

17. An apparatus as defined in claim 16 wherein the membrane extends across the width of the enclosure and divides the enclosure into two sections, the membrane including therein an opening through which the fish are persuaded to swim from one section of the enclosure to the other section.

18. An apparatus as defined in claim 17 wherein the size of the opening can be varied and the opening size can be controlled from a remote position.

19. An apparatus as defined in claim 18 wherein the position of the membrane in the enclosure is pneumatically controlled from a remote position.

20. An apparatus as defined in claim 19 wherein the means for feeding the fish is a conduit connecting the upper region of the enclosing means with a remote position, the fish food being dispensed to the enclosing means through the conduit.

21. An apparatus as defined in claim 20 wherein the air pocket is maintained in the top region of the enclosing means by supplying air to the enclosing means from a remote position through a conduit.

* * * * *

UNITED STATES PATENT AND TRADEMARK OFFICE
CERTIFICATE OF CORRECTION

PATENT NO. : 4,744,331

DATED : May 17, 1988

INVENTOR(S) : David E. Whiffin

It is certified that error appears in the above-identified patent and that said Letters Patent is hereby corrected as shown below:

Col. 1, line 60   Change "0.2" to --0.1--

Col. 6, line 48   Change "union" to --Union--

Col. 7, line 6    Change "mintaining" to --maintaining--

Col. 7, line 51   Change "assist" to --assists--

Col. 7, line 61   Change "throug" to --through--

Col. 9, line 63   Change "shown," to --shown.--

Col. 12, line 22  Change "an" to --An--

Signed and Sealed this

Twentieth Day of March, 1990

Attest:

JEFFREY M. SAMUELS

*Attesting Officer*   Acting Commissioner of Patents and Trademarks